United States Patent [19]
Little et al.

[11] Patent Number: 5,964,885
[45] Date of Patent: Oct. 12, 1999

[54] METHOD AND SYSTEM FOR RECOVERING TEXT FROM A DAMAGED ELECTRONIC FILE

[75] Inventors: Robert Andrew Little; Stephan Brian Mueller, both of Redmond, Wash.

[73] Assignee: Microsoft Corporation, Redmond, Wash.

[21] Appl. No.: 08/891,897

[22] Filed: Jul. 14, 1997

[51] Int. Cl.[6] ................................................ G06F 11/00
[52] U.S. Cl. ............................ 714/2; 707/202; 714/764
[58] Field of Search ........................ 395/182.19, 182.04, 395/182.03, 185.02, 185.07, 704, 183.13, 183.14; 371/40.11, 40.2, 42, 55, 40.4, 40.12, 67.1, 71; 707/202, 104, 530; 714/6, 21, 37, 764, 819, 2

[56] References Cited

U.S. PATENT DOCUMENTS

| | | | |
|---|---|---|---|
| 5,793,381 | 8/1998 | Edberg et al. | 345/467 |
| 5,802,539 | 8/1998 | Daniels et al. | 707/542 |
| 5,870,762 | 2/1999 | Lee | 707/202 |

OTHER PUBLICATIONS

Peter Norton, "The Norton Utilities Version 5.0 Disk Explorer", pp. 116–118 and 125–129, 1990.

Primary Examiner—Robert W. Beausoliel, Jr.
Assistant Examiner—Christopher A. Revak
Attorney, Agent, or Firm—Jones & Askew, LLP

[57] ABSTRACT

Recovering text from a damaged electronic file by scanning an arbitrary stream of bytes and extracting text that is encoded as ASCII or Unicode. A byte of the damaged file is read. The read byte may be interpreted using the ASCII encoding standard. The read byte and the immediately preceding read byte may also be interpreted using the Unicode character encoding standard. The interpreted byte (s) is classified based upon the likelihood that the byte(s) is actually text for the particular character set rather than a control character, damaged data, or an element other than a textual character. The classifications are used to adjust a likelihood counter for each character type. The likelihood counter may be an integer value that indicates the probability that a text run has been detected. A text run is a sequence of bytes that is believed to be undamaged text. Each likelihood counter is then examined to determine whether there is a text run for one of the character types. If there is a text run, then the starting position of the text run is saved. The entire text run is output when the text run ends.

22 Claims, 7 Drawing Sheets

METHOD AND SYSTEM FOR RECOVERING TEXT FROM A DAMAGED ELECTRONIC FILE

TECHNICAL FIELD

This invention relates to recovering text from a damaged electronic file. More particularly, this invention relates to a method and system for recovering text from a damaged electronic file containing single byte text and multiple byte text.

BACKGROUND OF THE INVENTION

Using modern word processing program modules to create and edit electronic files, or electronic documents, is often convenient and efficient. However, under certain circumstances, files may become damaged or corrupted. Damaged files are often unreadable by the application program module that created them. Thus, the time invested in creating the file is lost unless some of the file can be salvaged.

There are many different causes of file damage, or file corruption. One cause is a communication error, i.e., garbled transmission of a file via a modem or network. Another cause of file damage is a disk error, i.e., a failure of the storage media on which the file resides. A bug in an application program module that creates a file may also damage the file. Still another cause of file damage is a failure in an operating system while a user is working with a file. Thus, document corruption is a common problem that is difficult to avoid.

When a file is damaged, users want to retrieve the ndamaged data, i.e. the undamaged bytes, from the file. Users are annoyed if they cannot retrieve any data from a damaged file because the file must be completely reconstructed. In a word processing electronic file, the most important data contained in the file is almost always the actual text of the document. The formatting and the non-textual elements are usually less important. Thus, many different converters have been developed to retrieve undamaged text from a damaged file. Unfortunately, these converters are often incompatible with modem file formats which are described below.

Files created by modem application programs often have complex file formats. Modem file formats typically contain intricate, interconnected data structures. For example, consider the file format of the "WORD 8.0" program, a word processing program module marketed by Microsoft Corporation of Redmond, Washington. The "WORD 8.0" program has a file format comprising both single byte ASCII characters and Unicode characters. Unicode is a worldwide character encoding standard that uses two bytes to identify a character by defining one two-byte value to represent the same character worldwide. Thus, modem file formats, such as the "WORD 8.0" file format, are often quite complex and may contain both single byte characters and multiple byte characters.

The complexity of modern electronic files has some interesting ramifications with regard to damaged files. Should a modem file become damaged, there is a high probability that it will be unreadable by the program that created it. In contrast, corruption of a file stored in a simpler file format is unlikely to cause the file to become unreadable. For example, consider a file stored in the relatively simple file format known as plain ASCII text. If data in a plain ASCII text file becomes damaged, a text editor may be used to read the file and a user may then correct the damaged portions of the file. Thus, the user may extract and salvage uncorrupted portions of the damaged file. However, modern electronic files are often unreadable when damaged because there is a scarcity of applications for extracting data from a modem file format. For example, once again consider the file format of the "WORD 8.0" program. Currently, only one converter and the "WORD 8.0" program itself can read the "WORD 8.0" file format. In contrast, if a plain ASCII text file becomes corrupted so that it is unreadable by a particular converter, there are many other converters that may be used to attempt to retrieve the undamaged data. Unfortunately, the converters designed to recover ASCII text can not extract text from damaged documents with multiple-byte text.

Therefore, if a modem application program file becomes damaged, it is likely that the damaged file will be unreadable by the creating application program. It is also likely that there is no external converter to read the file. Thus, in many cases, there is no way for a user to recover undamaged data contained within a damaged file.

There is a need in the art for a method and system for recovering text from a damaged file with a modem, complex file format. There is a further need in the art for a method and system for recovering text from a damaged electronic file comprising single byte characters and multiple byte characters.

SUMMARY OF THE INVENTION

The present invention satisfies the above described needs by supporting the recovery of text from a damaged electronic file. Generally described, the present invention provides a computer-implemented method for scanning an arbitrary stream of bytes and extracting text that is encoded as ASCII or Unicode. The method may walk through the file one byte at a time, assuming that a particular byte might be an ASCII character, the first half a Unicode character, or the second half of a Unicode character. The present invention attempts to interpret every byte in possible character encoding configurations.

In one aspect, the present invention is a computerimplemented method for recovering text from a damaged electronic file. One or more bytes of the electronic file are read and interpreted using a character encoding standard. The byte(s) can be interpreted by comparing the value of the byte(s) to the codes of a character encoding standard. The byte(s) may then be classified based upon the type of character that matches the value of the byte(s). Four classifications can be used for the byte(s): Control, Valid, Invalid, and Good. A likelihood counter is adjusted for the character encoding standard based upon the classification of the byte(s). A separate likelihood counter can be maintained for each different character encoding standard that is possible in the electronic file. A determination may be made whether there is a text run for a character encoding standard and, if so, then the byte(s) is output. This determination can be reached by examining the likelihood counter to determine whether the likelihood counter exceeds a predetermined value. These steps may be repeated until every byte in the electronic file has been read and processed.

In yet another aspect, the present invention supports the recovery of text from a damaged electronic file by reading byte (n) of the file, where n is a variable initially set equal to one when the file is opened. Byte (n) is interpreted and classified as an ASCII character. An ASCII likelihood counter may be adjusted based on the classification of the ASCII character. A determination is made whether the variable n is an even number or an odd number. If n is even, then byte (n) and byte (n−1) is interpreted and classified as an even offset big-endian Unicode character and an even offset little-endian Unicode character. An even offset big-endian Unicode likelihood counter may be adjusted based upon the classification of byte (n) and byte (n−1) as an even offset big-endian Unicode character. An even offset little-endian Unicode likelihood counter may be adjusted based upon the classification of byte (n) and byte (n−1) as an even offset little-endian Unicode character.

However, if n is odd, then byte (n) and byte (n−1) may be interpreted as an odd offset big-endian Unicode character and an odd offset little-endian Unicode character. Byte (n) and byte (n−1) may be classified as an odd offset big-endian Unicode character and an odd offset little-endian Unicode character. An odd offset big-endian Unicode likelihood counter may be adjusted based upon the classification of byte (n) and byte (n−1) as an odd offset big-endian Unicode character. An odd offset little-endian Unicode likelihood counter may be adjusted based upon the classification of byte (n) and byte (n−1) as an odd offset little-endian Unicode character. It is then determined whether there is a text run based upon the likelihood counters.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
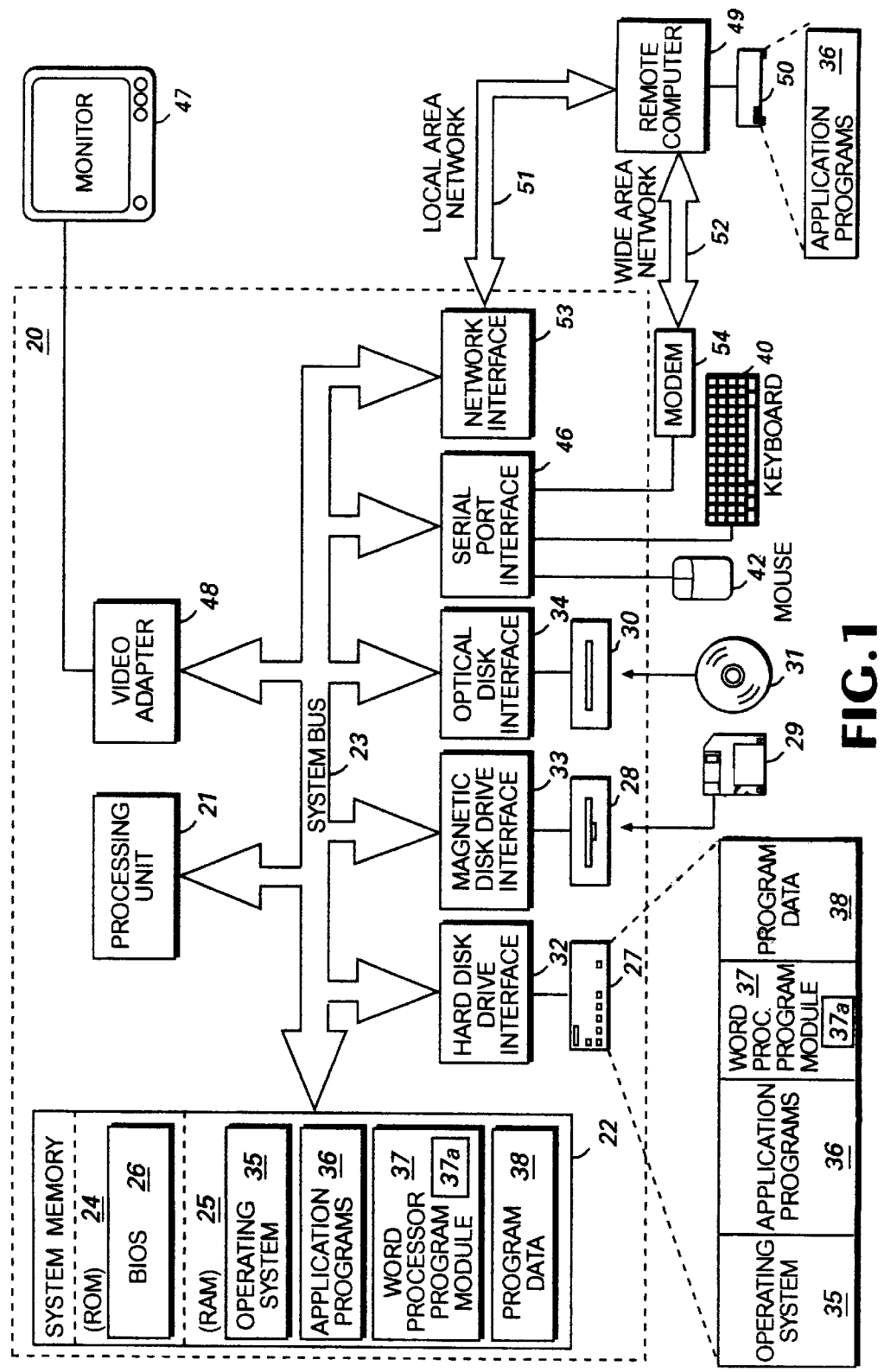
FIG. 1 is a block diagram of a computer that provides the exemplary operating environment for the present invention.

The present invention is directed toward a method and system for recovering text from a damaged electronic file or damaged electronic document. In one embodiment, the invention is incorporated into a preferred word processing application program entitled "WORD 8.0", marketed by Microsoft Corporation of Redmond, Washington. Briefly described, the preferred application program allows a user to create and edit electronic documents by entering characters, symbols, graphical objects, and commands.

The preferred application program also allows a user to recover text from a damaged electronic file. Generally described, a text recovery converter in accordance with an embodiment of the present invention is incorporated into the preferred application program module and reads a byte of a damaged file. The read byte is interpreted using the ASCII encoding standard. The read byte and the immediately preceding read byte are also interpreted using the Unicode character encoding standard. The interpreted byte(s) is classified based upon the likelihood that the byte(s) is actually text for the particular character set rather than a control character, damaged data, or an element other than a textual character. The classifications are used to adjust a likelihood counter for each character type. The likelihood counter may be an integer value that indicates the probability that a text run has been detected. Each likelihood counter is then examined to determine whether there is a text run for one of the character types. A text run is a sequence of bytes that is believed to be undamaged text. If there is a text run, then the text is output to the word processing program module until the text run ends.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37, program data 38, and other program modules (not shown). The word processor program module 37 may also include a text recovery converter program module 37a for recovering undamaged text from a damaged electronic file.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having described an exemplary operating environment for the present invention, it will prove helpful to generally describe the ASCII and Unicode character sets before proceeding with the detailed description.

The ASCII Character Set

ASCII, or American Standard Code for Information Interchange, is a character encoding standard that assigns numerical values to letters, numbers, punctuation marks, and certain other characters. ASCII allows computers to exchange information by providing them with standard numerical values for characters. ASCII provides for 256 codes divided into a standard character set of 128 codes and an extended character set of 128 codes. The standard ASCII character set uses 7 bits for each code resulting in 128 character codes ranging from 0 to 127. The extended ASCII character set uses 8 bits for each code resulting in 128 additional character codes ranging from 128 to 255.

The standard ASCII character set is universal among computer hardware and software. However, computer manufacturers and software developers may assign the extended ASCII character set to different characters. For example, the Latin 1 extended ASCII character set, or Latin 1 code page, defines the extended character set as essentially the English language characters. The extended ASCII character set is not as interchangeable among different programs and computers as the standard ASCII character set is because the extended ASCII character set may be defined differently by different programs and computers. Thus, the Unicode character set was designed to provide a universal character set that could be interchanged between virtually all programs and computers. The Unicode character set is described below in detail.

The Unicode Character Set

Unicode is a world-wide character encoding standard in which virtually every character in virtually every major language worldwide is assigned a unique 16-bit, or two byte, value. Thus, in Unicode, each two byte value has one meaning worldwide so that applications do not have to support different extended ASCII character sets. Utilizing 16 bits, Unicode can encode 65,536 characters. The first 128 characters of Unicode are identical to the characters of the ASCII standard set.

The two bytes that comprise a Unicode character may be stored in either big-endian order or little-endian order. Bigendian order means that the most significant byte is stored at the lowest memory address. Little-endian order means that the least significant byte is stored at the lowest memory address. For example, the hexadecimal number A02B would be stored as A02B in big-endian order and as 2BA0 in little-endian order. Typically, the order is suggested by the computer hardware. Thus, Unicode documents originating on some processing units will be stored in big-endian order, while those originating on other processing units will be stored in little-endian order.

For more information on the Unicode character set, consult *The Unicode Standard, Version* 2.0, Addison Wesley Developers Press, 1996 (ISBN 0-201-48345-9).

Recovering Text From a Damaged File

Figure 2:
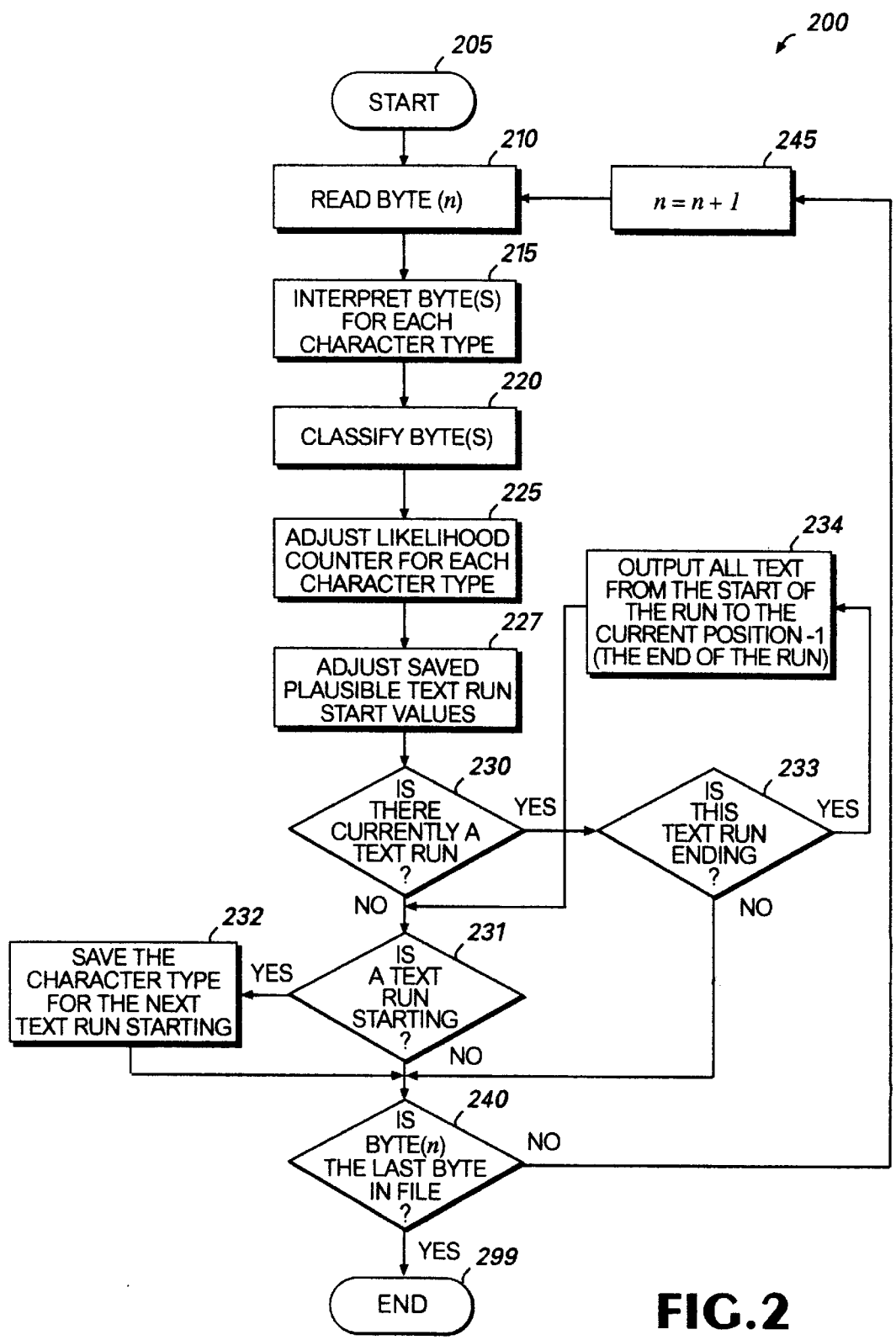
FIG. 2 is a flowchart illustrating a method for recovering text from a damaged file in accordance with an exemplary embodiment of the present invention.

Briefly described, the present invention provides a method and system for recovering text from a damaged electronic file. FIG. 2 is a flow chart illustrating a method 200 for recovering text from a damaged electronic file in accordance with an exemplary embodiment of the present invention. Those skilled in the art will appreciate that this exemplary embodiment is a computer-implemented process that is carried out by the computer in response to input from the user and instructions provided by a program module.

Referring to FIG. 2, the method 200 begins at start step 205 and proceeds to step 210. The method 200 may proceed to step 210 after the user chooses a "recover text from file" option from a file drop down menu displayed on monitor 47 (FIG. 1). The method 200 may also proceed to step 210 after the following steps. The word processing program module 37 may write the name of a file in a registry when opening the file. If the word processing program module 37 opens the file smoothly, then the name of the file is deleted from the registry. However, if the word processing program module 37 crashes, then the name of the file remains in the registry. On the subsequent boot of the word processing program module 37, the user is prompted with a dialog box that warns the user that this file may be corrupt, but that some of the contents may be recoverable. The user is asked via the dialog box whether he wishes to attempt to recover the contents. If so, then the text recovery converter program module 37a is called and method 200 begins and proceeds from start step 205 to step 210. Having described two examples of the manner in which method 200 may begin, the remaining steps of method 200 are described below.

At step 210, a damaged file is opened and byte (n) of the file is read. When the damaged file is first opened, the variable, n, is preferably set equal to one and the first byte of the file is read. The variable, n, is used to represent which byte of the file is being read. After reading byte (n) of the file at step 210, the method proceeds to step 215.

At step 215, byte (n) and, for some character types, byte (n−1) are interpreted for the different character types. Preferably, a character type comprises a particular character encoding standard including any order information, such as big-endian or little-endian, that is used with the character encoding standard. The preferred character types are ASCII, even offset big-endian Unicode, even offset little-endian Unicode, odd offset big-endian Unicode, and odd offset little-endian Unicode. Even offset means that the Unicode characters end on bytes where n is an even integer, while odd offset means that the Unicode characters end on bytes where n is an odd integer. It is important to interpret characters under both even offset and odd offset.

It should be understood that the term byte(s) will be used to refer herein to byte (n), when used in connection with the ASCII character type. It should be further understood that the term byte(s) will be used to refer herein to byte(n) and byte (n−1) when used in connection with the Unicode character types.

Interpretation preferably comprises comparing the value of a byte(s) to a character encoding standard to determine which, if any, of the characters of the character encoding standard that the byte(s) matches. The byte(s) may match a preferred textual character such as the letters of the English alphabet on a machine in an English environment. Alternatively, the byte(s) may match a control character, a non-preferred textual character such as the letters not in the English alphabet on a machine in an English environment, or an undefined character.

For example, byte (n) may be interpreted for the following character types: an ASCII character type, a second byte of a big-endian Unicode character type beginning at byte (n−1), a second byte of a little-endian Unicode character type beginning at byte (n−1), a first byte of a big-endian Unicode character type ending at byte (n+1), or a first byte of a little-endian Unicode character type ending at byte (n+1). It will be obvious that if the first byte of a document is being read, then only one interpretation is made, preferably ASCII, because only one byte has been read. However, once at least two bytes have been read in a file, there are a total of five potential character types involving byte (n). It is also important to note that as each byte is read, only three interpretations are made. For example, when byte (n) is read, the big-endian Unicode character type ending at byte (n+1) and the little-endian Unicode character type ending at byte (n+1) are started but not completed because byte (n+1) has not been read yet. These two character types will only be completed and interpretable when byte (n+1) is read. Preferably, the interpretation for each character type is tracked separately and simultaneously with the interpretations for the other character types.

It should be understood that if n is equal to one, i.e., byte (n) is the first byte of the file, then byte (n) is simply interpreted as the ASCII character type because there is no byte (n−1) in the file.

As another example, if byte (n), where n>1, is equal to the decimal value 65, then byte (n) may be interpreted as the ASCII character 'A'. Alternatively, byte (n) may be interpreted as the first byte of a big-endian Unicode character ending at byte (n+1), the first byte of a little-endian Unicode character ending at byte (n+1), the second byte of a big-endian Unicode character beginning at byte (n−1), or the second byte of a little-endian Unicode character beginning at byte (n−1).

After the byte(s) is interpreted for each character type at step 215, the method proceeds to step 220. At step 220, the interpreted byte(s) is classified. Preferably, four classifications are used to classify the byte(s). The classifications are Good, Valid, Invalid, and Control. An Invalid classification means that the byte(s) is definitely not a textual character. A Control classification means that the byte(s) matches a special textual character, such as a tab or carriage return. A Good classification means that the byte(s) most likely represents a textual character. A Valid classification means the byte(s) is not Invalid, but the byte(s) also probably does not represent a textual character. The same four classifications are used for both ASCII and Unicode character types, although the preferred classification rules are different for these different encoding standards. The classification rules for the different encoding standards will be described in more detail in reference to FIGS. 4 and 5.

The classifications of step 220 are used to determine whether or not the interpreted byte(s) is part of a text run for a particular character type. A text run is a sequence of bytes that is believed to be undamaged text. Preferably, a text run is found by classifying the interpreted byte(s) and then adjusting a likelihood counter for each character type based upon these classifications. The likelihood counter is an integer value that indicates the probability that a text run has been detected. Preferably, there is a likelihood counter for each character type.

At step 225, a likelihood counter for each character type is adjusted, or updated. When the likelihood counter for a particular character type reaches a predetermined level, a text run is indicated, as will be described below in detail.

It is important to find a text run for the following reasons, among others. Bytes used to compose executable programs have decimal values of 0–255 and are individually indistinguishable from ASCII bytes and Unicode bytes. Thus, a sequence, or run, of bytes that appears to be textual characters is necessary to verify that the bytes are actually text rather than bytes of an executable program. For example, an executable program may be full of instructions for the processor and many of those instructions may have the same value as ASCII characters. However, these bytes are executable instructions and are not textual characters. By finding text runs, the "noise" created by executable instructions may be avoided. Moreover, not every byte that is interpreted and classified as Good using an embodiment of the present invention is necessarily printable text. For example, a byte in a file with the decimal value 65 may represent the ASCII character 'A', but if the byte is not adjacent to other bytes that are interpreted and classified as Good, then it is unlikely that the byte is a textual character. In other words, it is contiguous sequences of bytes that are interpreted and classified as Good that are most likely to be textual characters.

Therefore, an assessment of the likelihood that a text run has been found is maintained and updated for each character type based on the classifications of the interpreted byte(s). This assessment is referred to as the likelihood counter. As mentioned above, a separate likelihood counter is maintained for each character type (i.e., single byte ASCII characters, big-endian and little-endian characters starting at odd file offsets, and big-endian and little-endian characters starting at even file offsets).

Preferably, the likelihood counters are expressed as an integer score in the range of −5 to +5. The likelihood counters are initially set to −5. A Good classification increases the likelihood counter by 1, but not above +5. A Control classification does not affect the likelihood counter. An Invalid classification resets the likelihood counter to its minimum, −5. A Valid classification decreases the likelihood counter by 1, but not below −5. Preferably, a sequence of bytes is considered to be a text run when the likelihood counter becomes +5. The text run retroactively begins with the first plausible byte(s) encountered for the character classification. The text run preferably ends when the likelihood counter becomes zero or negative.

Referring again to FIG. 2, at step 227, a set of saved plausible text run start values is adjusted based on the current character classifications. Preferably, n is saved for every character type whose current classification is Good and does not previously have a saved value. Furthermore, any saved value should be cleared for every character type whose current classification is Invalid.

Referring again to FIG. 2, at decision step 230, it is determined whether or not there is already a text run as determined in decision step 231 in a previous iteration of the method. It follows that the there cannot already be a text run in the first iteration of the method.

If it is determined in decision step 230 that there is not already a text run, then the method proceeds to decision step 231 where it is determined whether or not a text run is beginning for one of the character types using one of the methods described below. In one embodiment, a sequence of six or more consecutive Good interpretations is considered a text run. In the preferred embodiment, a sequence of mostly Good bytes containing no Invalid bytes is deemed a text run when one of the likelihood counters exceeds a predetermined threshold. The predetermined threshold is arbitrarily set by a program module designer to avoid the noise created by executable instructions and damaged bytes, as described above. For example, preferably, the predetermined threshold is set to five so that a sequence of bytes is deemed a text run when the likelihood counter for a particular character type reaches positive five.

If it is determined that there is a text run at decision step 231, then the method proceeds to step 232. In step 232, the character type of the text run that is starting is saved for later reference in step 234. It is understood that this text run continues until otherwise indicated in decision step 233 described below. Preferably, once a text run has been detected in some character type, output of that text, in that character type, occurs when the text run ends. However, text run detection continues for all character types, including adjusting each likelihood counter, regardless of whether text is being output for that character type. Output of text will occur in step 234 when the end of the current text run is detected in decision step 233.

It may be possible for multiple likelihood counters to be positive simultaneously. However, output will only occur in the character type that first became positive. Should more than one likelihood counter become positive after examining the same byte (i.e., at the same time) an arbitrary character type preferably "wins" and is deemed the text run. If a likelihood counter becomes positive during a text run for a separate character classification, that character position n will be stored in step 227 as previously described, but preferably it will not alter the disposition of the current text run.

If it is determined at decision step 231 that a text run is not starting, the method proceeds to decision step 240.

Referring again to decision step 230, if it is determined that there currently is a text run, the method will proceed to decision step 233. It is now determined if the text run is ending. When the likelihood counter for the character type for the current text run becomes negative or zero, the text run is considered to be ending and the method proceeds to step 234. The text run which begins at the first plausible character saved in step 227 and ending at the character immediately preceding the current character is output to the word processing program module 37 (FIG. 1) at step 234. The method then proceeds to step 231. If it is determined at decision step 233 that the current text run is not ending, the method proceeds to decision step 240.

At decision step 240, it is determined whether byte (n) was the last byte in the damaged file. If so, then the method ends at step 299. If not, then the method proceeds to step 245. At step 245, the variable n is set equal to (n+1) and the method proceeds to step 210 where byte (n) is read. Having described a method for recovering text from a damaged file in accordance with an exemplary embodiment of the present invention, the preferred method for recovering text from a damaged file now will be described.

Figure 3A:
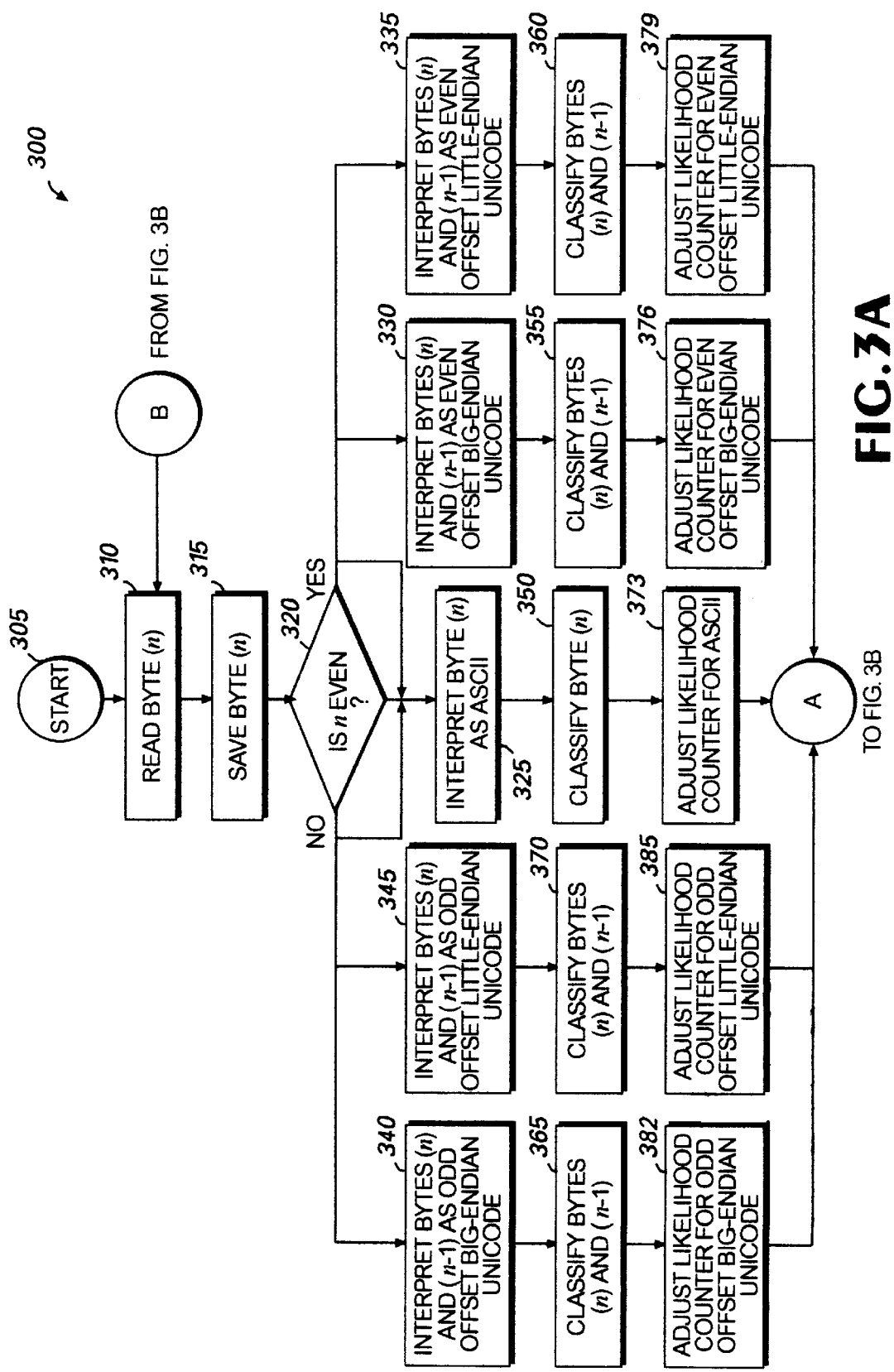
FIGS. 3A-3B are flowcharts illustrating the preferred method for recovering text from a damaged file.
Figure 3B:
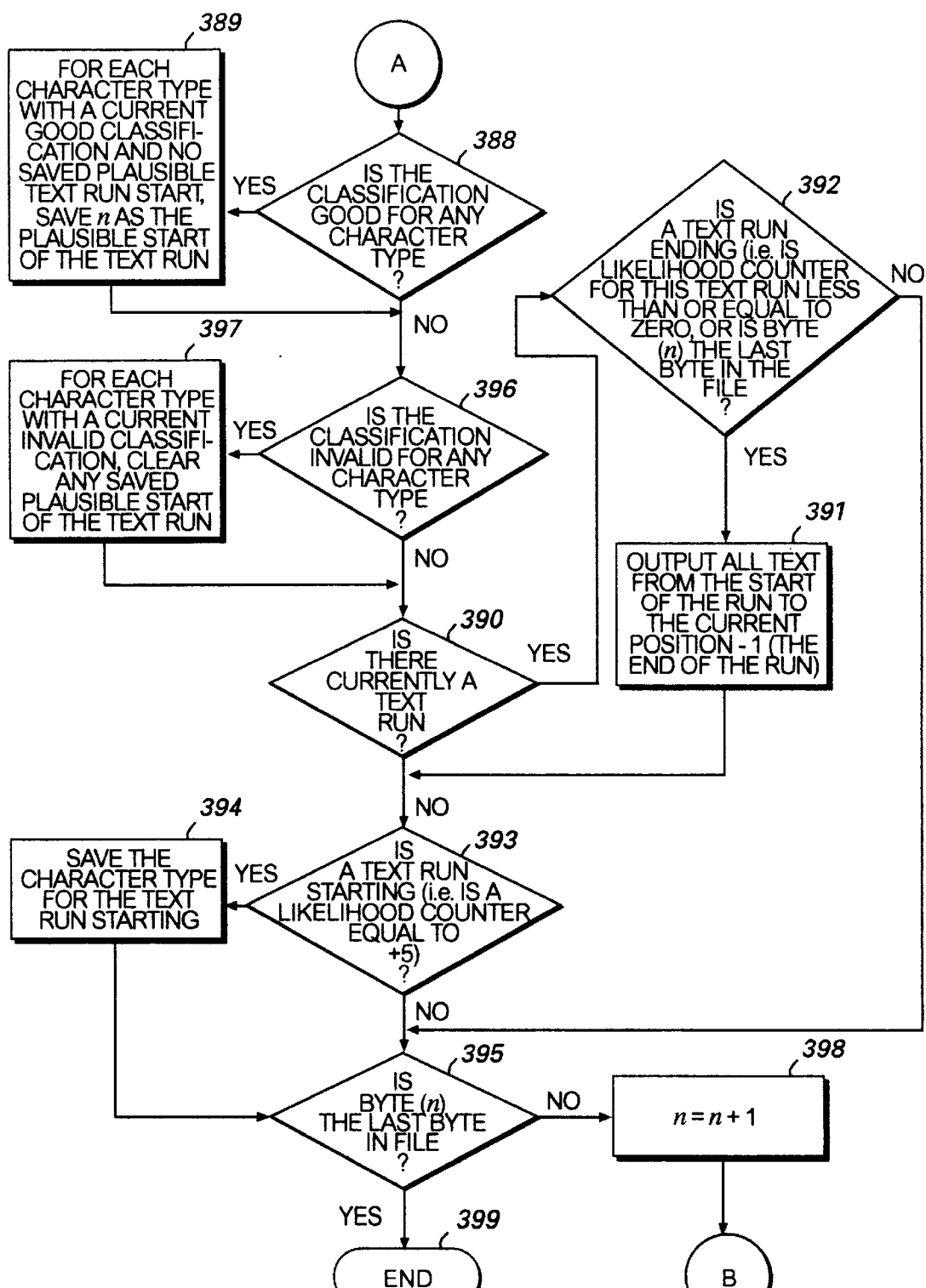

Referring now to FIGS. 3A-3B, flowcharts illustrating the preferred method 300 for recovering text from a damaged electronic file will be described. At step 305 the method begins and proceeds to step 310 where byte (n) of a damaged electronic file is read. When the damaged file is first opened, the variable, n, is preferably set equal to one and the first byte of the file is read. The variable, n, is used to represent which byte of the document is being read.

At step 315, byte (n) is saved. For example, byte (n) may be saved in memory, such as system memory 22 (FIG. 1). Byte (n) may be saved at step 315 so that it may be used with byte (n+1) to interpret a big-endian or little-endian Unicode character ending at byte (n+1). The method then proceeds to decision step 320.

At decision step 320, it is determined whether n is an even or odd integer value. Whether n is even or odd is determined because this will determine which likelihood counters are adjusted. As mentioned above, there are preferably five character types: a single byte ASCII character type, an even offset big-endian Unicode character type, an even offset little-endian Unicode character type, an odd offset big-endian Unicode character type, and an odd offset little-endian Unicode character type. The Unicode character types that end on a byte where n is even may be referred to as even offset Unicode, while the Unicode character types that end on a byte where n is odd may be referred to as odd offset Unicode. It is important to track all five possible character types simultaneously, although only three likelihood counters will be adjusted for each byte read. In other words, if n is even, the likelihood counters for single byte ASCII character type, even offset big-endian Unicode, and even offset little-endian Unicode will be adjusted. However, if n is odd, the likelihood counters for single byte ASCII character type, odd offset big-endian Unicode, and odd offset little-endian Unicode will be adjusted.

If, at decision step 320, it is determined that n is even, then the method proceeds to steps 325, 330, and 335. However, if, at decision step 320, it is determined that n is odd, then the method proceeds to steps 325, 340, and 345.

At step 325, byte (n) is interpreted using the ASCII character encoding standard. This interpretation preferably comprises comparing the decimal value of byte (n) to the ASCII character encoding standard.

At step 330, byte (n) and byte (n−1) are interpreted as even offset big-endian Unicode. This interpretation preferably comprises comparing the decimal value of bytes (n) and (n−1) to the big-endian Unicode encoding standard.

At step 335, byte (n) and byte (n−1) are interpreted as even offset little-endian Unicode. This interpretation preferably comprises comparing the decimal value of bytes (n) and (n−1) to the little-endian Unicode encoding standard.

At step 340, byte (n) and byte (n−1) are interpreted as odd offset big-endian Unicode. This interpretation preferably comprises comparing the decimal value of bytes (n) and (n−1) to the big-endian Unicode encoding standard.

At step 345, byte (n) and byte (n−1) are interpreted as odd offset little-endian Unicode. This interpretation preferably comprises comparing the decimal value of bytes (n) and (n−1) to the little-endian Unicode encoding standard.

Of course, it should be understood that steps 330, 335, 340, and 345 are not conducted when the first byte in the damaged file is read, i.e., when n is equal to one.

After interpretation steps 325, 330, 335, 340, and 345, the method proceeds to classification steps 350, 355, 360, 365 and 370, respectively.

At steps 350, 355, 360, 365 and 370, the byte(s) interpreted at steps 325, 330, 335, 340 and 345, respectively, are classified and the method proceeds to steps 373, 376, 379, 382, and 385 respectively. Preferably, the byte(s) is classified as Good, Valid, Invalid, or Control. The preferred classification methods are described in relation to FIGS. 4 and 5.

At step 373, the likelihood counter for the ASCII character type is adjusted and the method proceeds to step 388 of FIG. 3B via node A. It should be understood that node A is simply a visual aid to connect the steps of method 300 illustrated in FIG. 3A to the remaining steps of method 300 illustrated in FIG. 3B, and that node A is not a step of method 300.

Referring again to FIG. 3A, at step 376, the likelihood counter for the even offset big-endian Unicode character type is adjusted and the method proceeds to step 388 of FIG. 3B via node A.

At step 379, the likelihood counter for the even offset little-endian Unicode character type is adjusted and the method proceeds to step 388 of FIG. 3B via node A.

At step 382, the likelihood counter for the odd offset big-endian Unicode character type is adjusted and the method proceeds to step 388 of FIG. 3B via node A.

At step 385, the likelihood counter for the odd offset little-endian Unicode character type is adjusted and the method proceeds to step 388 of FIG. 3B via node A.

Preferably, each likelihood counter is adjusted based on the classifications found at steps 350, 355, 360, 365, and 370. The preferred adjustment steps will be described in detail in relation to FIG. 6.

Referring now to FIG. 3B, at decision step 388, it is determined whether a character type has a current classification of Good. If so, the method proceeds to step 389. If there are no Good classifications, the method proceeds to decision step 396.

At step 389, the current value n is saved as a plausible text run start for each character type whose current classification is Good and the method proceeds to decision step 396. This saved value may later be used as the starting position of a text run in step 391 if it is later determined that a sequence of bytes possibly starting at the saved value comprises a text run as determined in decision step 393.

At decision step 396, it is determined whether a character type has a current classification of Invalid. If so, the method proceeds to step 397. If there are no Invalid classifications, the method proceeds to decision step 390.

At step 397, any saved plausible text run start values for each character type whose current classification is Invalid are cleared and the method proceeds to decision step 390.

At decision step 390, it is determined whether or not there is a current text run as determined by decision step 393 in a previous iteration of the method. In other words, at decision step 390, it is determined whether or not a text run has already been started in step 394 in a previous iteration of the method. If there is a current text run, the method proceeds to decision step 392. If there is not a current text run, the method proceeds to decision step 393.

At decision step 392, it is determined if the current text run is ending. This determination is made by checking the likelihood counter of the current text run's character classification. If the likelihood counter is less than or equal to zero, then the text run is considered to have ended and the method proceeds to step 391. Additionally, if byte (n) is the last byte of the file, then the method also proceeds to step 391. If the text run has not ended, the method proceeds to decision step 395.

At step 391, the current text run which begins at the first plausible character saved in step 389 and ending at the character immediately preceding the current character is output to the preferred application program module and the method proceeds to decision step 393.

At decision step 393, it is determined whether or not a text run is beginning by examining the likelihood counters for each character classification. If any of the likelihood counters is equal to the predetermined threshold value +5, then the method proceeds to step 394. If a text run is not starting, then the method proceeds to decision step 395.

At step 394, the character type for the starting text run is saved for later reference in step 391. If more than one text run has been detected at this point, an arbitrary decision is made as to the character type to be saved. This implementation chooses the character type using the following order of precedence: ASCII, little endian odd-offset Unicode, little endian even-offset Unicode, big endian odd-offset Unicode, big endian even-offset Unicode. The method then proceeds to decision step 395.

At decision step 395, it is determined whether byte (n) is the last byte in the damaged file and, if so, then the method ends at step 399. If byte (n) is not the last byte in the damaged file, then the variable n is set equal to (n+1) at step 398 and the method returns to step 310 via node B. It should be understood that node B is simply a visual aid to connect the steps of method 300 illustrated in FIG. 3B to the steps of method 300 illustrated in FIG. 3A and that node B is not a step of method 300.

Having described the preferred method 300 for recovering text from a damaged electronic file, the preferred method for classifying an ASCII character type byte will be described in reference to FIG. 4, the preferred method for classifying Unicode character type bytes will be described in reference to FIG. 5, and the preferred method for adjusting the likelihood counter for each character type will be described in reference to FIG. 6.

Figure 4:
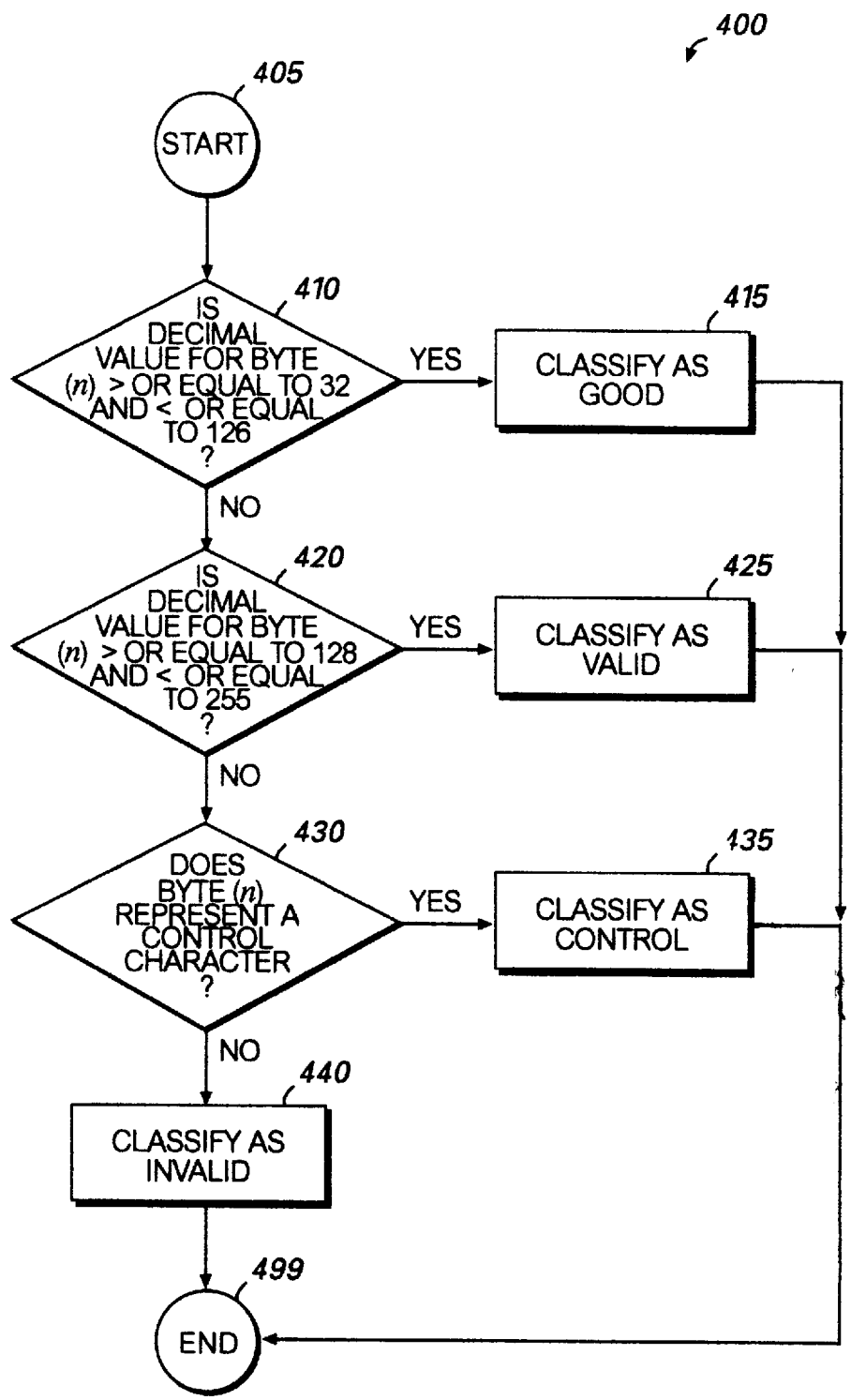
FIG. 4 is a flowchart illustrating the preferred method for classifying an ASCII character type byte.

Referring now to FIG. 4, the preferred method for classifying ASCII character type bytes (the preferred method for performing step 350 of FIG. 3A) will be described. At decision step 405, method 400 begins and proceeds to step 410, where it is determined whether the decimal value of byte (n) is greater than or equal to 32 and less than or equal to 126. The principal ASCII characters including punctuation, all digits, and all upper and lower case letters are represented by the decimal values 32–126. Thus, preferably, if the decimal value of byte (n) is greater than or equal to 32 and less than or equal to 126, then byte (n) most likely represents a textual character.

If, at decision step 410, it is determined that the decimal value of byte (n) is greater than or equal to 32 and less than or equal to 126, then the method proceeds to step 415 and byte (n) is classified as Good. The method 400 then ends at step 499.

However, if, at step 410, it is determined that the decimal value of byte (n) is not greater than or equal to 32 and less than or equal to 126, then the method proceeds to decision step 420.

At decision step 420, it is determined whether the decimal value of byte (n) is greater than or equal to 128 and less than or equal to 255. ASCII characters 128–255 are language specific characters, i.e., these characters are the extended ASCII character set.

If, at decision step 420, it is determined that the decimal value of byte (n) is greater than or equal to 128 and less than or equal to 255, then the method proceeds to step 425 and byte (n) is classified as Valid. A Valid byte may be a textual character, but is not likely to be a textual character because it is part of the extended ASCII character set. Characters that comprise the extended ASCII character set may be foreign language letters, mathematical symbols, picture symbols, or non-printable text. Since these extended characters are not well defined, it is arbitrarily assumed that they are neither Good nor Invalid characters and are thus considered Valid characters. The method then ends at step 499.

However, if, at step 420, it is determined that the decimal value of byte (n) is not greater than or equal to 128 and less than or equal to 255, then the method proceeds to decision step 430.

At decision step 430, it is determined whether byte (n) represents a control character. Control characters are preferably the carriage return, line feed, and tab characters, or a Microsoft Word table cell separator. In ASCII, the code for line feed is decimal value 10, the code for carriage return is decimal value 13, and the code for tab is decimal value 9, and the code for the Microsoft Word table cell separator is decimal value 7.

If, at decision step 430, it is determined that byte (n) is a control character, then the method proceeds to step 435. Byte (n) is classified as a control character at step 435. The method then ends at step 499.

However, if, at decision step 430, it is determined that byte (n) does not represent a control character, then the method proceeds to step 440. Byte (n) is classified as Invalid at step 440. A byte that represents a character such as DEL (decimal value 127), a number of low end characters of ASCII, and control characters that are not related to text, such as transmission protocol characters, are preferably classified as Invalid. The method for classifying ASCII text then ends at step 499.

Figure 5:
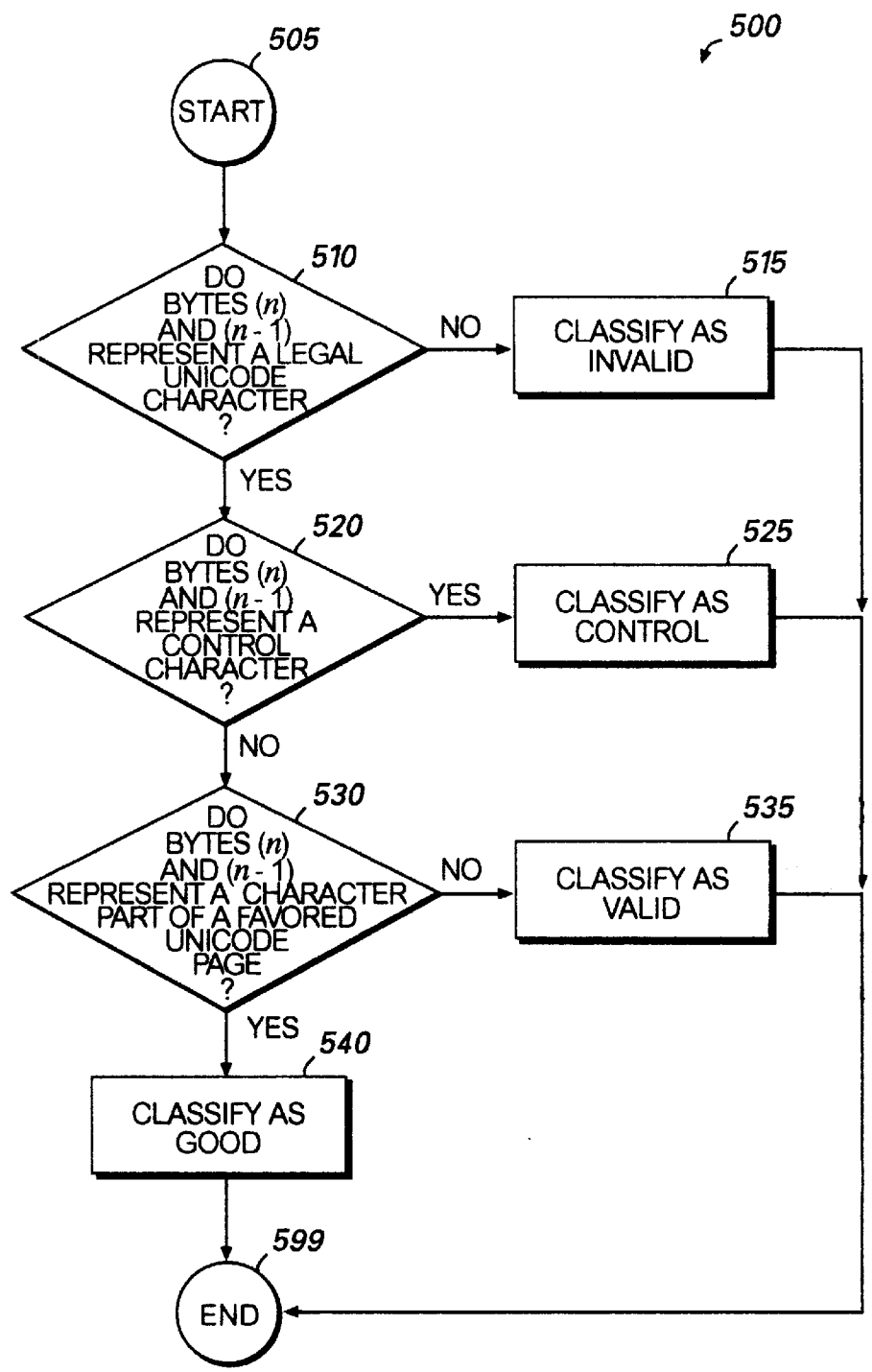
FIG. 5 is a flowchart illustrating the preferred method for classifying Unicode character type bytes.

Referring now to FIG. 5, the preferred method 500 for classifying Unicode text will be described. Method 500 is the preferred method for performing steps 355, 360, 365, and 370 of method 300 (FIGS. 3A-3B). At step 505, the method 500 begins and proceeds to decision step 510 where it is determined whether byte (n) and byte (n-1) represent a legal Unicode character. Preferably, step 510 is accomplished by determining whether the decimal value of byte (n) and byte (n-1) is within a defined Unicode subrange (USR). If so, then the bytes represent a legal Unicode character. The general method for determining legal Unicode characters is to search for a Unicode subrange. There is a Unicode subrange for all major world languages such as Japanese, Hebrew, etc. Thus, step 510 may be a simple brute force comparison to see if bytes (n) and (n-1) are within any known defined Unicode subrange.

If, at decision step 510, it is determined that bytes (n) and (n-1) do not represent a legal Unicode character, then the method proceeds to step 515. The bytes are classified as Invalid at step 515. The method then ends at step 599.

However, if, at decision step 510, it is determined that bytes (n) and (n-1) do represent a legal Unicode character, then the method proceeds to decision step 520.

At decision step 520, it is determined whether bytes (n) and (n-1) represent a control character. The Unicode control characters are the same as the ASCII control characters. The control characters are preferably carriage return, line feed, tab, and the Microsoft Word cell separator.

If, at decision step 520, it is determined that bytes (n) and (n-1) represent a control character, then the bytes are classified as Control at step 525. Then method then ends at decision step 599.

However, if, at decision step 520, it is determined that bytes (n) and (n-1) do not represent a control character, then the method proceeds to decision step 530.

At decision step 530, it is determined whether the bytes represent a character that is part of a favored Unicode page. The preferred application program module includes a favored Unicode page that relates to the text that is most likely to be used by the user of the program module. The favored Unicode page preferably comprises all ASCII textual characters plus a language specific code page. For example, a U.S. version of the preferred application program module favors ASCII textual characters and a U.S. code page. As another example, a Japanese version of the preferred application program module favors ASCII textual characters and a Japanese code page. The Japanese version favors the Japanese code page because it is more likely than not that documents opened by the Japanese version will contain Japanese text. Thus, Unicode character type bytes are classified as Good if they represent an ASCII textual character or one of the favored code page characters.

If, at decision step 530, it is determined that the bytes do not represent a character that is part of a favored Unicode page, then the bytes are classified as Valid at step 535. The method then ends at step 599.

However, if, at decision step 530, it is determined that the bytes do represent a character that is part of a favored Unicode page, then the method proceeds to step 540. The bytes are classified as Good at step 540. The method then ends at step 599.

Figure 6:
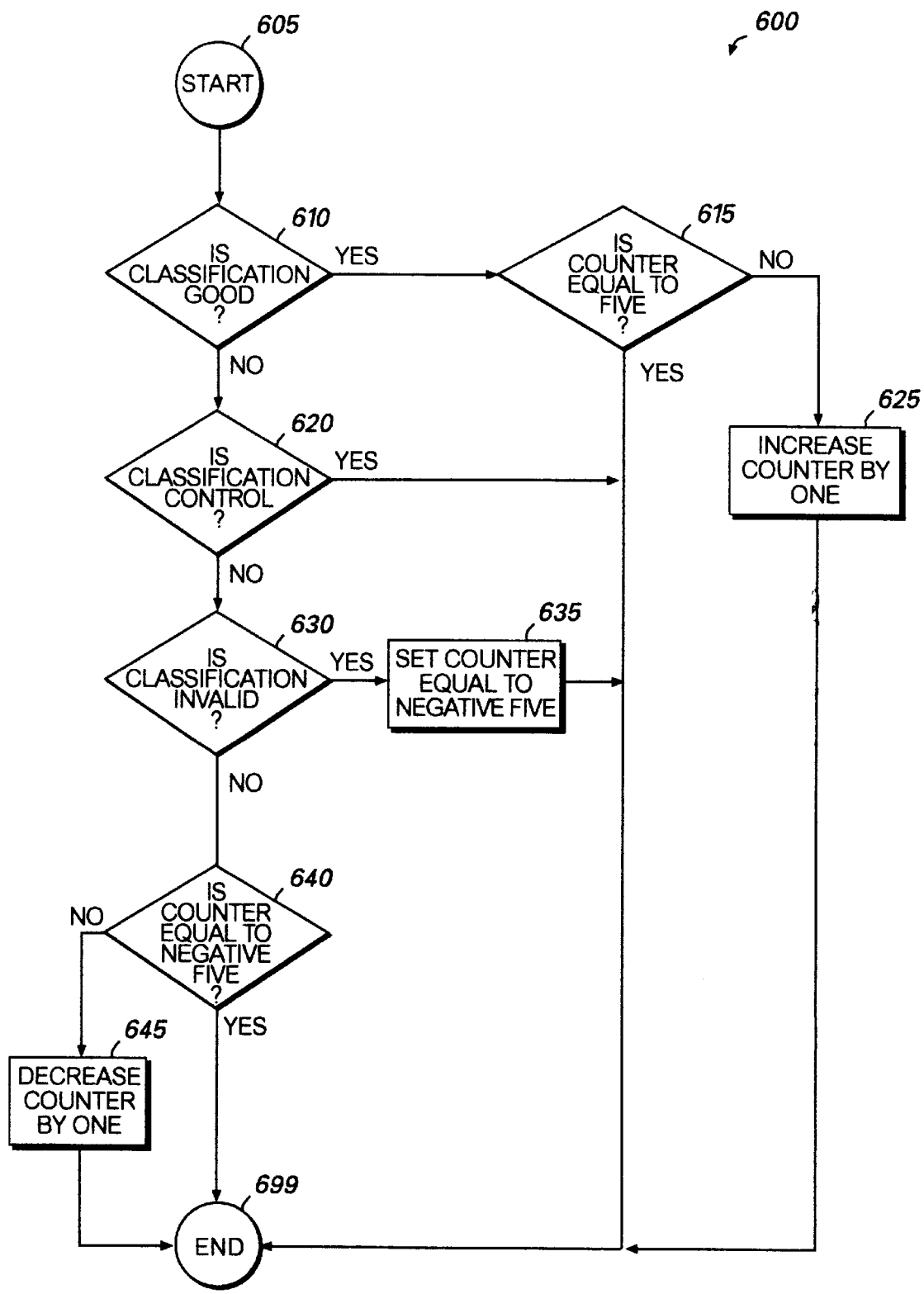
FIG. 6 is a flowchart illustrating the preferred method for adjusting the likelihood counter for each character type.

Referring now to FIG. 6, the preferred method 600 for adjusting the likelihood counter will be described. Method 600 is the preferred method for performing steps 373, 376, 379, 382, and 385 of FIG. 3A. The method 600 begins at start step 605 and proceeds to decision step 610 where it is determined whether the classification for the byte(s) is Good. If so, then the method proceeds to decision step 615. However, if the byte(s) is not classified as Good, then the method proceeds to decision step 620.

At decision step 615, it is determined whether the likelihood counter is equal to five. If so, then the method ends at step 699. However, if the likelihood counter is not equal to five, then the likelihood counter is increased by one at step 625 and the method ends at step 699.

Referring now to decision step 620, it is determined whether the byte(s) is classified as Control. If so, then the method ends at step 699. However, if the byte(s) is not classified as Control, then the method proceeds to decision step 630.

At decision step 630, it is determined whether the byte(s) is classified as Invalid. If the byte(s) is classified as Invalid, then the method proceeds to step 635 and the likelihood counter is set equal to negative five and the method ends at step 699.

However, if, at decision step 630, it is determined that the byte(s) is not classified as Invalid, then the byte(s) is Valid and the method proceeds to decision step 640.

At decision step 640, it is determined whether the likelihood counter is equal to negative five. If so, then the method ends at step 699.

However, if, at decision step 640, it is determined that the likelihood counter is not equal to negative five, then the method proceeds to step 645.

At step 645, the likelihood counter is decreased by one and the method ends at step 699.

From the foregoing description, it will be apparent to those skilled in the art that the present invention provides a method and system for recovering text from a damaged file. A byte of the damaged file is read. The read byte may be interpreted using the ASCII encoding standard. The read byte and the immediately preceding read byte may also be interpreted using the Unicode character encoding standard. The interpreted byte(s) is classified based upon the likelihood that the byte(s) is actually text for the particular character set rather than a control character, damaged data, or an element other than a textual character. The classifications are used to adjust a likelihood counter for each character type. The likelihood counter may be an integer value that indicates the probability that a text run has been detected. Each likelihood counter is then examined to determine whether there is a text run for one of the character types. If there is a text run, then the starting position for the text run is saved. The entire text run is output when the text run ends.

It should be understood that, preferably, the entire text run is output for a particular character type when the text run for that particular character type ends. This is true even if a different text run starts during a previously identified text run for another character type. In an alternative embodiment, the likelihood counters for all character types that have a text run could be compared to one another after each byte is read and processed to determine if a current text run should end in favor of a new text run composed of a different character type.

It should also be noted that preferably the text run is output in Rich Text Format (RTF). The text run in RTF is preferably sent to the word processor program module 37 which creates a new electronic file in the same manner as it does when obtaining RTF data from any other source.

Although the present invention has been described above as implemented in the preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For an electronic system for creating and editing an electronic file, a method for recovering text from a damaged electronic file, the method comprising the steps of:

(a) reading a portion of the electronic file;

(b) generating an interpretation result interpreting the portion using a character encoding standard;

(c) classifying the portion based on the interpretation result;

(d) determining without manual intervention the likelihood there is a text run for the character encoding standard; and (e) if so, then outputting the portion.

2. The method recited in claim 1 further comprising the step of:

(f) if it is determined there is not a text run, then reading a second portion of the electronic file.

3. The method recited in claim 1 wherein the character encoding standard is Unicode.

4. The method recited in claim 1 wherein the character encoding standard is ASCII.

5. The method recited in claim 1 wherein the portion comprises a byte.

6. The method recited in claim 5, wherein the step of determining the likelihood there is a text run for the character encoding standard comprises the steps of:

adjusting a likelihood counter for the character encoding standard based upon the classification of the byte; and comparing the likelihood counter to a predetermined value, whereby it is determined whether there is a text run.

7. The method recited in claim 6 further comprising the step of:

examining the likelihood counter to determine whether the likelihood counter exceeds the predetermined value and, if so, then determining there is a text run.

8. The method recited in claim 5, further comprising the step of repeating steps (a)–(e) for each remaining byte in the electronic file.

9. The method recited in claim 5, wherein the step of interpreting the byte comprises comparing the byte to the character encoding standard to determine a particular character of the character encoding standard that matches the byte.

10. The method recited in claim 9, wherein the step of classifying the byte comprises classifying the byte as Good, Valid, Invalid, or Control based upon the particular character found in the interpreting step.

11. The method recited in claim 1 wherein the portion comprises two bytes.

12. For an electronic system for creating and editing an electronic file, a method for recovering text from a damaged electronic file, the method comprising the steps of:

(a) reading byte (n) of the file, where n is a variable initially set equal to one when the file is opened;

(b) interpreting byte (n) as an ASCII character;

(c) classifying byte (n) as an ASCII character;

(d) adjusting an ASCII likelihood counter based upon the classification of byte (n) as an ASCII character;

(e) determining whether the variable n is an even number or an odd number;

(f) if variable n is even, then interpreting byte (n) and byte (n−1) as an even offset little-endian Unicode character;

(g) classifying byte (n) and byte (n−1) as an even offset little-endian Unicode character;

(h) adjusting an even offset little-endian Unicode likelihood counter based upon the classification of byte (n) and byte (n−1) as an even offset little-endian Unicode character;

(i) if variable n is odd, then interpreting byte (n) and byte (n−1) as an odd offset little-endian Unicode character;

(j) classifying byte (n) and byte (n−1) as an odd offset little-endian Unicode character;

(k) adjusting an odd offset little-endian Unicode likelihood counter based upon the classification of byte (n) and byte (n−1) as an odd offset little-endian Unicode character; and (l) determining whether there is a text run for any of the likelihood counters.

13. A computer-readable medium having computer-executable instructions for performing the steps recited in claim 12.

14. The method recited in claim 12, wherein the step of classifying byte (n) as an ASCII character comprises the steps of:

determining whether the decimal value of byte (n) is greater than or equal to 32 and less than or equal to 126;

if so, then classifying byte (n) as a good ASCII character;

if not, then determining whether the decimal value for byte (n) is greater than or equal to 128 and less than or equal to 255;

if so, then classifying byte (n) as a valid ASCII character;

if not, then determining whether byte (n) represents an ASCII control character;

if so, then classifying byte (n) as a control ASCII character; and if not, then classifying byte (n) as an invalid ASCII character.

15. The method recited in claim 12 further comprising the step of increasing the value of n by one and repeating steps (a)–(l).

16. The method recited in claim 12, wherein the steps of classifying byte (n) and byte (n–1) as Unicode characters comprises the steps of:

determining whether byte (n) and byte (n–1) represent a legal Unicode character;

if not, then classifying byte (n) and byte (n–1) as an invalid Unicode character;

if byte (n) and byte (n–1) represent a legal Unicode character, then determining whether byte (n) and byte (n–1) represent a control character;

if so, then classifying byte (n) and byte (n–1) as a control Unicode character;

if byte (n) and byte (n–1) do not represent a control character, then determining whether byte (n) and byte (n–1) are part of a favored Unicode page;

if so, then classifying byte (n) and byte (n–1) as a good Unicode character; and if not, then classifying byte (n) and byte (n–1) as a valid Unicode character.

17. The method recited in claim 12, wherein the steps of adjusting the likelihood counters comprises the steps of:

determining whether the classification of the byte is Good and if so, then determining whether the likelihood counter is equal to five;

if the likelihood counter is not equal to five, then increasing the likelihood counter by one;

determining whether the classification of the byte is Control and if so, then not adjusting the likelihood counter;

determining whether the classification of the byte is Invalid and if so, then setting the likelihood counter equal to negative five;

determining whether the classification of the byte is Valid and if so, then determining whether the likelihood counter is equal to negative five; and if the likelihood counter is not equal to negative five, then decreasing the likelihood counter by one.

18. A computer-readable medium having a program module including instructions which, when executed perform steps for recovering text from a damaged electronic file, comprising:

(a) reading a byte of the electronic file;

(b) interpreting the byte using a character encoding standard by comparing the byte to the character encoding standard and determining whether a particular character of the character encoding standard matches the byte;

(c) classifying the byte;

(d) determining the likelihood there is a text run for the character encoding standard by adjusting a likelihood counter for the character encoding standard based upon the classification of the byte and comparing the likelihood counter to a predetermined value; and (e) in the event that a determination is made that there is a text run, then outputting the byte.

19. The computer-readable medium of claim 18, wherein the program module comprises further instructions which, when executed, perform the step of examining the likelihood counter to determine whether the likelihood counter exceeds the predetermined value and, if so, then determining that there is a text run for the character encoding standard.

20. The computer-readable medium of claim 18, wherein the program module further comprises instructions which, when executed, perform the step of reading another byte of the electronic file in the event that a determination is made that a text run does not correspond to the character encoding standard.

21. The computer-readable medium of claim 18, wherein the program module comprises further instructions which, when executed, perform the steps (a)–(e) for each remaining byte in the electronic file.

22. The computer-readable medium of claim 18, wherein the step of classifying the byte of the electronic file comprises classifying the byte as Good, Valid, Invalid, or Control based upon the character of the character encoding standard corresponding to the byte.

* * * * *